United States Patent [19]
Seidel

[11] Patent Number: 5,815,480
[45] Date of Patent: Sep. 29, 1998

[54] METHOD FOR CALCULATING AND RECORDING A START PROGRAM RADIUS UPON A COMPACT DISC

[75] Inventor: Robert Seidel, West Pittston, Pa.

[73] Assignee: WEA Manufacturing, Inc., Olyphant, Pa.

[21] Appl. No.: 708,738

[22] Filed: Sep. 5, 1996

Related U.S. Application Data

[60] Provisional application No. 60/003,212 Sep. 5, 1995.
[51] Int. Cl. $^6$ .......................................................... G11B 3/90
[52] U.S. Cl. .............................................. 369/84; 369/58
[58] Field of Search .................................. 369/54, 58, 83, 369/84, 275.3, 30, 32, 33, 47, 53, 85; 360/13

[56] References Cited

U.S. PATENT DOCUMENTS

| | | | |
|---|---|---|---|
| 4,855,978 | 8/1989 | Kanamaru | .................................. 369/32 |
| 5,119,359 | 6/1992 | Miyagi et al. | .................. 369/275.3 X |
| 5,587,978 | 12/1996 | Endo et al. | ............................... 369/32 |

*Primary Examiner*—Paul W. Huber
*Attorney, Agent, or Firm*—Gottlieb, Rackman & Reisman, P.C.

[57] ABSTRACT

A process for determining the Start Program Point for a compact disc recording of data first recorded on an other medium, by measuring with the aid of a microscope the radius of the transition from the first pit/land transition from silence to data, measuring with the aid of an editor for the other medium a delay period of silence intended to be part of the data, calculating the Start Program Point and recording the Start Program Point thus calculated on the compact disc.

3 Claims, 1 Drawing Sheet

METHOD FOR CALCULATING AND RECORDING A START PROGRAM RADIUS UPON A COMPACT DISC

This non-provisional application claims the benefit of U.S. provisional application Ser. No. 60/003,212, filed on Sep. 5, 1995.

This invention relates to the optical recording of data on compact discs. In particular it relates to the proper location of the starting point for data on a compact disc.

BACKGROUND OF THE INVENTION

Compact discs are record carriers for digital or analog information, for example audio and/or video information, which have the form of a flat disc-shaped plastic surface on which a data modulated optical structure is provided in accordance with the information. The data is formed as pits of varying length present in the surface and arranged in a spiral path. The pits have nanometer dimensions and are formed by injection molding against a mold having corresponding raised regions. The present invention concerns the recording of digital data in the compact disc format.

A uniform standard has been established for compact disc recording in which it is necessary to place on the disc the exact coordinates for several physical features of the data so that they may be referenced by the players that interpret the data. It is conventional in the recording of data on a compact disc to have the lead-in and unused portion of the disc recorded with the codes that indicate silence in the case of an audio recording. This silence is not denoted by the absence of pits, but by a particular pattern.

One value that is required to be recorded as data for the player is the radius of the Start Program Point, which is defined as that point where a transition occurs from silence to data. This is normally done by inspecting the surface of the disc with the aid of a radius recording microscope and visually identifying the location of the first change in the data pattern, which of necessity is the change from silence to data. In those cases where the first data track is an audio track this leads to an error because audio silence has been mistaken for the lead-in preceding the data. What is required is an accurate method for determining the appropriate Start Program Point for audio tracks that normally have a lead-in time of silence.

BRIEF DESCRIPTION OF THE INVENTION

The present invention is a process for determining the Start Program Point where recorded data commences, even in the event that such data comprises silence. The process begins with measuring with the aid of a microscope the radius from the center of the disc R of the transition that is visible through said microscope of the first pit/land transition from silence to data, and measuring with the aid of an editor for the medium on which the audio material is provided for a length of time called a delay period, AT, of silence intended to be part of the data. A formula is given from which the required quantity can be calculated and that value recorded among the data on the compact disc.

FIG. 1 is a top view of a compact disc having a central hole C, a radius R at which a transition from silence to sound occurs, and a start program radius 1.

DETAILED DESCRIPTION OF A PREFERRED EMBODIMENT

Figure 1:
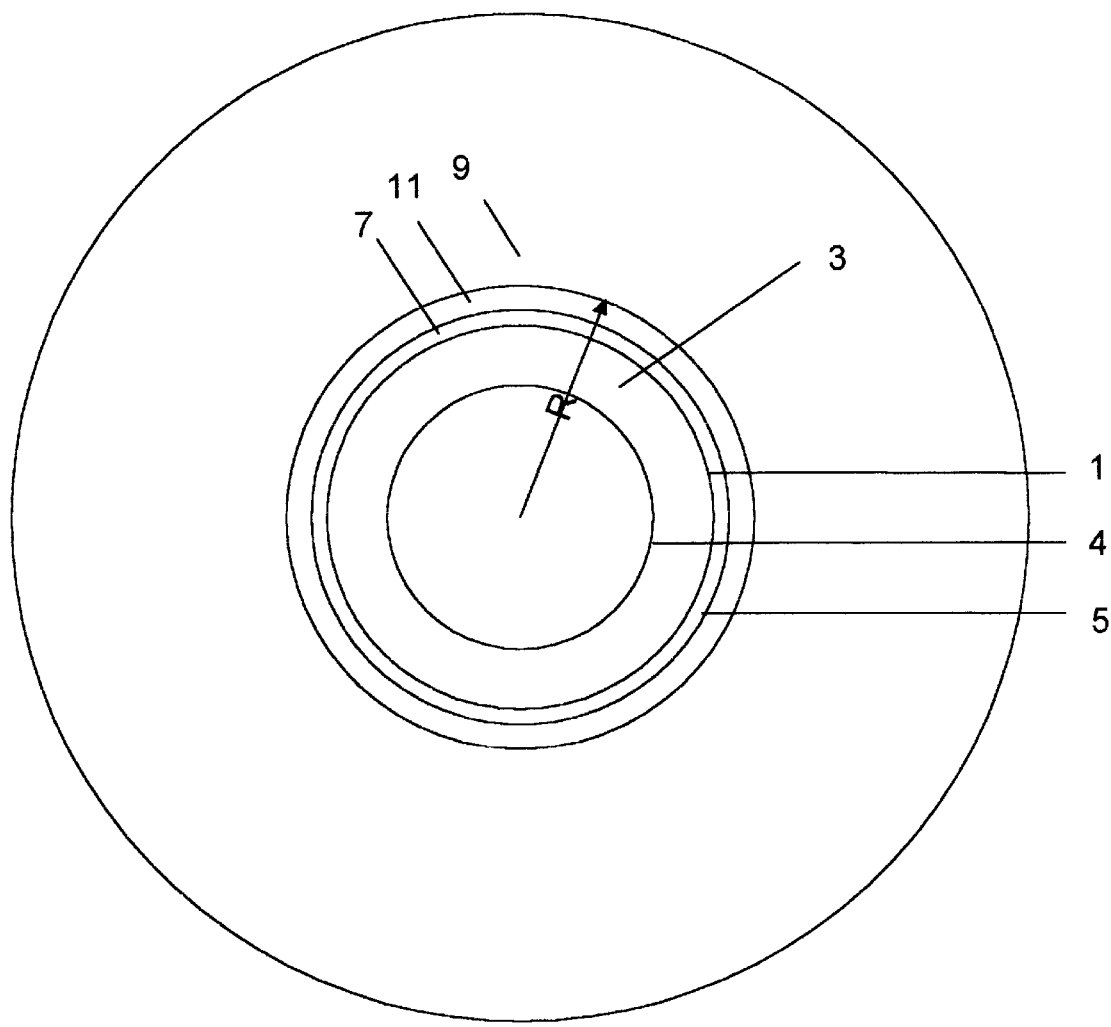

As shown in FIG. 1, the Start Lead-in 1 on a recorded compact disc is identified by the start point of the pit/land recording. This area is easily distinguished from the unrecorded matrix 3 on the inner radius of the disc. (Recording on a compact disc is done in a spiral expanding outwardly from a radius near the center 4 of the disc, in contrast to the more familiar manner of vinyl records where the spiral wound inwardly from near the outside edge.) The Start Program point 5 is identified by the transition point between two distinct pit/land patterns on the disc. The first pit/land pattern is designated as the lead-in area 7 and the second pattern 9 as the program area. This visible transition can be centered under the microscope having a radius counter. The radius counter value gives an incorrect value for the Start Program Radius when the compact disc's first recorded track is an audio data track commencing with silence 11. This occurs under CD-Audio format as well as others, such as the CD+G format.

Normally the amount of silence recorded as part of an audio track is between 2 and 3 seconds. The exact length can be determined from the (typically) tape recording of the audio signal. Where the information is provided in a CD format, the exact point could be determined by scrolling the disc in an editor, such as the Sony CDP 3000, to the first CD frame within track 1, index 1 that contains audible information. The Start Program Radius can then be calculated from the formula:

$$\sqrt{(R^2-(SV)(TP)(AT)/\pi)}$$

where the compact disc recording format has a known pit/land pattern designating silence, a known scanning velocity (SV) and track pitch (TP).

Typical values for these parameters are SV=1.3 m/sec, TP=1.6×10$^{-6}$ m.

While there have been shown and described and pointed out the fundamental novel features of the invention as applied to preferred embodiments thereof, it will be understood that various omissions and substitutions and changes in the form and details of the device illustrated and in its operation may be made by those skilled in the art without departing from the spirit of the invention.

I claim:

1. A process for providing a compact disc accurately encoding the Start Program Point for a compact disc recording of data first recorded on an other medium, where the compact disc recording format has a known pit/land pattern designating silence, a known scanning velocity (SV) and track pitch (TP), comprising the steps of:
    (a) measuring with the aid of a microscope the radius R of the transition visible through said microscope of the first pit/land transition from silence to data,
    (b) measuring with the aid of an editor for the other medium a delay period, AT, of silence intended to be part of the data,
    (c) calculating the Start Program Point,
    (d) recording the Start Program Point thus calculated among the data represented on the compact disc as pits and lands.
2. The process of claim 1 wherein said calculating step comprises calculating the Start Program Point from the following formula $$\sqrt{(R^2-(SV)(TP)(AT)/\pi)}.$$

3. The process of claim 1 wherein
    said transition is measured by the use of a microscope and radius counter,
    said delay period of silence is measured for a CD medium as the delay from Track 1, index 0 to the transition point from silence to audio within Track 1, index 1.

* * * * *